(12) United States Patent
Pavani et al.

(10) Patent No.: US 9,851,475 B2
(45) Date of Patent: Dec. 26, 2017

(54) FABRICATION OF LENSES USING HIGH VISCOSITY LIQUID

(71) Applicants: Sri Rama Prasanna Pavani, Palo Alto, CA (US); Brian P. McCall, Houston, TX (US)

(72) Inventors: Sri Rama Prasanna Pavani, Palo Alto, CA (US); Brian P. McCall, Houston, TX (US)

(73) Assignee: Ricoh Company, Ltd., Tokyo (JP)

( * ) Notice: Subject to any disclaimer, the term of this patent is extended or adjusted under 35 U.S.C. 154(b) by 265 days.

(21) Appl. No.: 13/693,870

(22) Filed: Dec. 4, 2012

(65) Prior Publication Data

US 2014/0153104 A1 Jun. 5, 2014

(51) Int. Cl.

| | |
|---|---|
| G02B 11/00 | (2006.01) |
| G02B 13/00 | (2006.01) |
| G02B 15/00 | (2006.01) |
| G02B 17/00 | (2006.01) |
| G02B 25/00 | (2006.01) |
| G02B 3/00 | (2006.01) |
| G02B 7/00 | (2006.01) |
| G02B 9/00 | (2006.01) |
| G02B 27/10 | (2006.01) |
| B29D 11/00 | (2006.01) |

(52) U.S. Cl.
CPC ...... *G02B 3/0012* (2013.01); *B29D 11/00365* (2013.01)

(58) Field of Classification Search
CPC ............... B41J 2/1646; A61K 51/1244; B01L 2300/0654; H01L 51/5275; H01L 27/14627; H01L 27/14685; H01L 51/5209; H01L 51/5225; G02B 3/0012; B29D 11/00365
USPC .......................................... 359/619, 620, 621
See application file for complete search history.

(56) References Cited

U.S. PATENT DOCUMENTS

| | | | | |
|---|---|---|---|---|
| 5,800,907 | A | * | 9/1998 | Yumoto ..................... 428/195.1 |
| 5,864,128 | A | | 1/1999 | Plesko |
| 5,886,722 | A | * | 3/1999 | Kuehnle .................. B41J 2/005 346/140.1 |
| 6,805,902 | B1 | | 10/2004 | Hayes |
| 6,814,901 | B2 | * | 11/2004 | Itoh .............................. 264/1.38 |
| 6,872,334 | B2 | | 3/2005 | Karita |
| 2006/0012058 | A1 | | 1/2006 | Hasei |
| 2007/0216047 | A1 | | 9/2007 | Rudmann et al. |
| 2009/0186304 | A1 | | 7/2009 | Liu |

OTHER PUBLICATIONS

R.Danzebrink, M.A. Aegerter, Deposition of micropatterened coating using an ink-jet technique; 1999, Thin Solid Films 351, pp. 115-118.*

(Continued)

*Primary Examiner* — Alicia M Harrington
(74) *Attorney, Agent, or Firm* — Fenwick & West LLP

(57) ABSTRACT

A method for fabricating millimeter and sub-millimeter size lenses using a high viscosity curable liquid, such as epoxy. The method comprises dispensing a predetermined volume of the curable liquid onto a substrate. The curable liquid preferably has a viscosity higher than 100 cps. Additionally, to reduce spherical aberration, the curable liquid can be cured upside down to leverage the effects of gravity.

20 Claims, 4 Drawing Sheets

(56) References Cited

OTHER PUBLICATIONS

Bertola, V., "Some Applications of Controlled Drop Deposition on Solid Surfaces," Recent Patents on Mechanical Engineering 2008, pp. 167-174, vol. 1.

Cox, W. R. et al., "Fabrication of Micro-Optics by Microjet Printing," Proc. of SPIE Micro-Optics, Micromechanics and Laser Scanning and Shaping, May 1995, pp. 110-115, vol. 2383.

Hsiao, S.-Y. et al., "The Implementation of Concave Micro Optical Devices Using a Polymer Dispensing Technique," J. Micromech. Microeng., pp. 1-7, 2008, vol. 18, Apr. 2008.

Hsieh, J. et al., "Integration of a UV Curable Polymer Lens and MUMPs Structures on a SOI Optical Bench," Journal of Micromechanics and Microengineering, 2007, pp. 1703-1709, vol. 17, Jul. 2007.

Kuo, S.-M. et al., "The Fabrication of Non-Spherical Microlens Arrays Utilizing a Novel SU-8 Stamping Method," J. Micromech. Microeng., 2008, pp. 1-7, vol. 18, Nov. 2008.

Schilling, A. et al., "Surface Profiles of Reflow Microlenses Under the Influence of Surface Tension and Gravity," Optical Engineering, Aug. 2000, pp. 2171-2176, vol. 39, No. 8.

\* cited by examiner

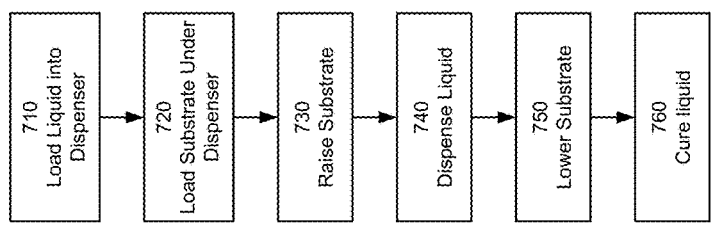
FIG. 7
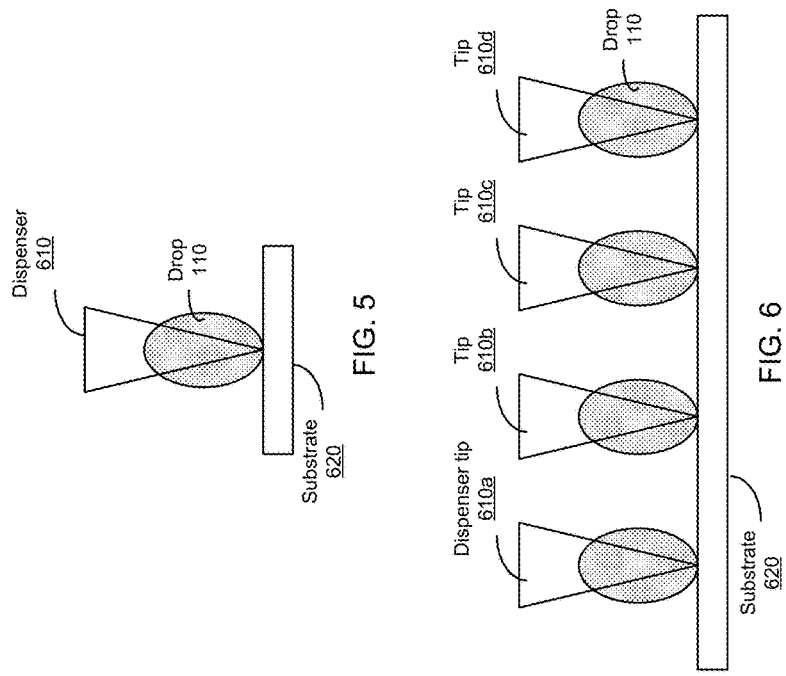
FIG. 5
FIG. 6

FABRICATION OF LENSES USING HIGH VISCOSITY LIQUID

BACKGROUND OF THE INVENTION

1. Field of the Invention

This invention relates generally to optical lenses and, more particularly, to the fabrication of millimeter and sub-millimeter size optical lenses.

2. Description of the Related Art

There is a growing need for small size lenses. With each passing generation of cell phones, the number of cell phones with integrated cameras increases. The miniaturization that enables cell phone cameras has also given rise to other types of small cameras. The increasing number and variety of small cameras and other optical instruments results in an increasing demand for small size lenses.

As another example, ubiquitous sensor networks can enable global sensing by connecting numerous dispersed intelligent sensors that sense their local ambiance for changes in physical entities such as light, temperature, sound, and pressure. To be truly ubiquitous, these intelligent sensors must be compact and mass-producible at low cost. Sensing light, in particular, is useful for detecting illumination variations, capturing images, and for harnessing energy. Light sensors use optical lenses for efficient light collection. Small light sensors use small optical lenses.

Conventional techniques for fabricating miniature lenses, such as diamond turning, molding, lithography, and inkjet printing employ complex fabrication processes that are not inexpensively customizable. Thus, there is a need for miniature lenses, with millimeter or sub-millimeter sizes, that preferably can be customized and produced at a low cost.

SUMMARY OF THE INVENTION

The present invention overcomes the limitations of the prior art by providing lenses fabricated using high viscosity liquid, such as liquid epoxy or liquid polymer. In one aspect, a known volume of transparent high-viscosity liquid epoxy is dispensed on a planar substrate. At equilibrium, the epoxy thus dispensed exhibits an approximately spheroidal outer surface primarily due to the surface tension between the epoxy and its surrounding media. Upon exposure to ultra-violet light, the epoxy is cured to form a lens (referred to as a liquid drop lens or LDL) with molecular scale surface smoothness.

Diameters and focal lengths of liquid drop lenses can be customized by varying the volume of epoxy dispensed. Additional customization is possible by varying surface tension, surface roughness, viscosity, temperature and/or the curing process. For example, the lens shape can be changed by curing when the epoxy is suspended from the substrate (upside down curing) rather than when the epoxy is supported by the substrate (right side up curing). Furthermore, multiple epoxy drops placed next to each other may be used to form arrays of liquid drop lenses, as may be useful in computational imaging applications such as stereo imaging and multiple aperture imaging.

Other aspects of the invention include methods, devices, systems and applications of the approaches described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5 shows a system for fabricating liquid drop lenses.

FIG. 6 shows a system for fabricating liquid drop lenses in parallel.

FIG. 7 is a flowchart for the fabrication process of a liquid drop lens.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A lens is an optical device that transmits and refracts light. As used herein, light is not limited to the visible spectrum and includes ultra-violet (UV) light, infra-red (IR) light, etc. A lens has two opposite surfaces, at least one of which is curved. As described herein, a liquid drop lens (LDL) is a type of lens that is fabricated by dispensing a drop of high-viscosity, curable liquid on a substrate. In some embodiments, the curable liquid or resin is a type of optically transparent, high viscosity epoxy or polymer that hardens after being exposed to ultra-violet (UV) radiation. In one embodiment, the high viscosity liquid has a viscosity greater than 50 cps, greater than 100 cps or more preferably greater than 200 cps. Due to the high viscosity and surface tension, a drop of liquid placed on top of a planar substrate adopts a nearly spheroidal shape which can focus beams of light the same way a conventional optical lens focuses light.

Mathematical Model of Liquid Drop Lenses

Figure 1:
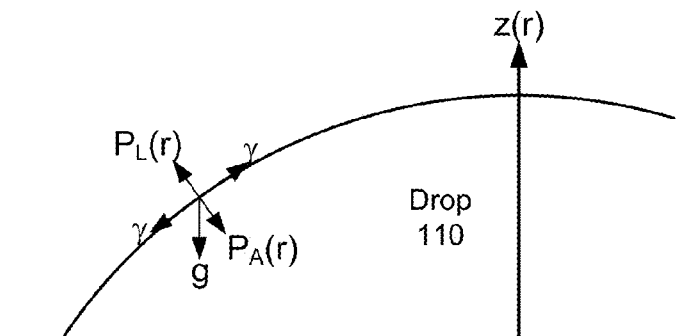
FIG. 1 is a free body diagram at the surface of a liquid drop lens before curing.

FIG. 1 illustrates a free body diagram at the surface of a drop 110 before curing. Assuming that there is no significant shape change during curing, the final liquid drop lens will have this same shape. The shape of the drop can be obtained by balancing the hydrostatic pressure equation and the Young-Laplace equation at every point around the liquid-gas interface. As a result, the second order ordinary differential equation describing the shape of a liquid drop lens is given by $$\frac{z''}{(1+(z')^2)^{3/2}} + \frac{z'}{r(1+(z')^2)^{1/2}} - \frac{z}{L_c^2} = const \quad (1)$$

where z(r) is the height of the drop at distance r from the axis of symmetry, $L_C$ is the characteristic length of the epoxy given by $$\sqrt{\frac{\gamma}{\rho g}},$$

where γ is the surface tension between the liquid and the gas, ρ is the liquid density and g is the acceleration due to gravity. The solution to equation (1) as an aspheric polynomial expansion is $$z(r) = \frac{r/R^2}{1+\sqrt{1-(r/R)^2}} + \sum_{n=2}^{N} a_n r^{2n} \quad (2)$$

where R is the radius of curvature at the apex of the lens. From equations (1) and (2), the aspheric coefficients of the liquid drop lens can be solved as $$a_2 = -\frac{1}{32R}\left(\frac{1}{R^2} + \frac{1}{L_c^2}\right) \quad (3)$$

$$a_3 = -\frac{1}{576R}\left(\frac{23}{R^4} + \frac{1}{2L_c^4} + \frac{47}{R^2 L_c^2}\right)$$

$$a_4 = -\frac{1}{819R}\left(\frac{375}{R^6} + \frac{1}{9L_c^6} + \frac{3745}{9R^4 L_c^2} + \frac{371}{9R^2 L_c^4}\right)$$

As shown above, the coefficients in this expression depend only on the apex radius of curvature (R) of the lens and the characteristic length ($L_C$) of the epoxy.

If the liquid drop lens is cured upside-down (i.e. while suspended from the substrate), gravity works in the opposite direction relative to the curvature of the lens. The effect of this is to pull the lens into a sharper curvature instead of flattening it out. Mathematically, the only difference is that a negative sign follows every instance of $L^2_C$ in the solution. The first few aspheric coefficients of a lens cured upside-down are instead $$a_2 = -\frac{1}{32R}\left(\frac{1}{R^2} - \frac{1}{L_c^2}\right) \quad (4)$$

$$a_3 = -\frac{1}{576R}\left(\frac{23}{R^4} + \frac{1}{2L_c^4} - \frac{47}{R^2 L_c^2}\right)$$

$$a_4 = -\frac{1}{819R}\left(\frac{375}{R^6} - \frac{1}{9L_c^6} - \frac{3745}{9R^4 L_c^2} + \frac{371}{9R^2 L_c^4}\right)$$

Figures 2A, 2B:
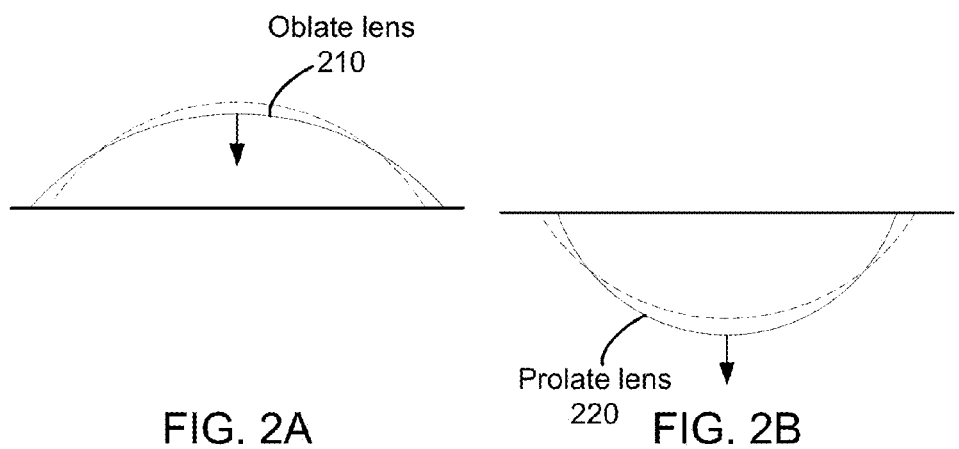
FIGS. 2A-2B illustrate the difference between a liquid drop lens cured right-side up and a liquid drop lens cured upside down.

FIGS. 2A-2B illustrate the difference between a lens cured right-side up and a lens cured upside down. There are two types of spheroids: oblate 210 and prolate 220. Both oblate 210 and prolate 220 spheroids can have the same radius of curvature at their apex, but oblate spheroids 210 are "flatter" than a sphere with the same apex radius of curvature, whereas prolate spheroids 220 are "sharper" than a sphere with the same apex radius of curvature. A liquid drop lens formed in zero gravity will have a spherical shape. Gravity will push a supported drop into an oblate spheroid 210 and will pull a suspended drop into a prolate spheroid 220, as shown in FIG. 2. The influence of gravity on lens shape is also dependent on the dimensions of the liquid drop lens. For lenses made out of the same material, gravity affects a large liquid drop lens more than a smaller liquid drop lens.

Figure 3C:
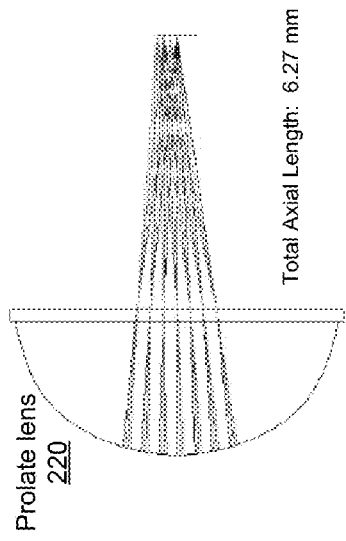
FIGS. 3A-3D are ray traces and spot diagrams, illustrating the difference between an oblate liquid drop lens and a prolate liquid drop lens.
Figure 3D:
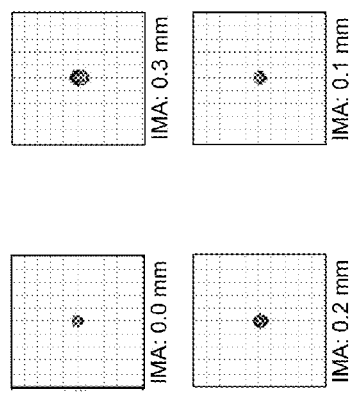
Figure 3A:
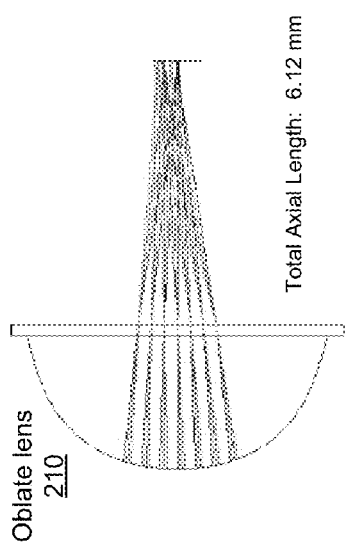
Figure 3B:
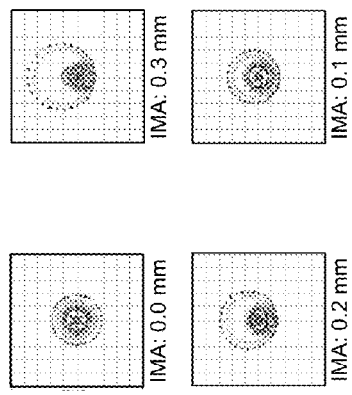

FIGS. 3A-3D further illustrate the difference between an oblate spheroid lens 210 and a prolate spheroid lens 220. FIGS. 3A-3B show a ray trace and corresponding spot diagrams for the oblate lens 210. FIGS. 3C-3D show a ray trace and corresponding spot diagrams for the prolate lens 220. For both lenses, the epoxy is NOA61, the focal length is 5.6 mm, the f/# is 3.5 and the full field of view is 6.13°. For both lenses, the ray intercepts in the image plane at four field points are shown. The prolate lens has a 6× reduction in spherical aberration compared to the oblate lens. This can be seen by comparing the smaller spot sizes of FIG. 3D to those in FIG. 3B. For imaging objects at a distance, prolate lens shapes are generally better than oblate lens shapes. As a result, upside-down curing is typically preferred compared to upright curing.

The solution of the second order ordinary differential equation (1) requires the addition of two independent parameters. One parameter is the volume of the lens, which can be precisely controlled by controlling the amount of curable liquid dropped on the substrate during the fabrication process. The other independent parameter is the contact angle, or the slope of the drop profile at the point where it touches the substrate on which it sits. An analytical expression exists for this contact angle which balances the forces of liquid-air, liquid-glass, and air-glass surface tensions.

One indirect way to measure the contact angle of a liquid is to measure the height of a puddle. As more and more volume is added to a drop, it eventually stops growing in height and simply expands at the sides. The drop becomes a puddle, which is flat at the top. The height of the puddle is related to the contact angle by $$\sin\frac{\theta_c}{2} = h_{max}\sqrt{\frac{\rho g}{\gamma}} \quad (5)$$

where θ is the contact angle and $h_{max}$ is the maximum height.

Figure 4:
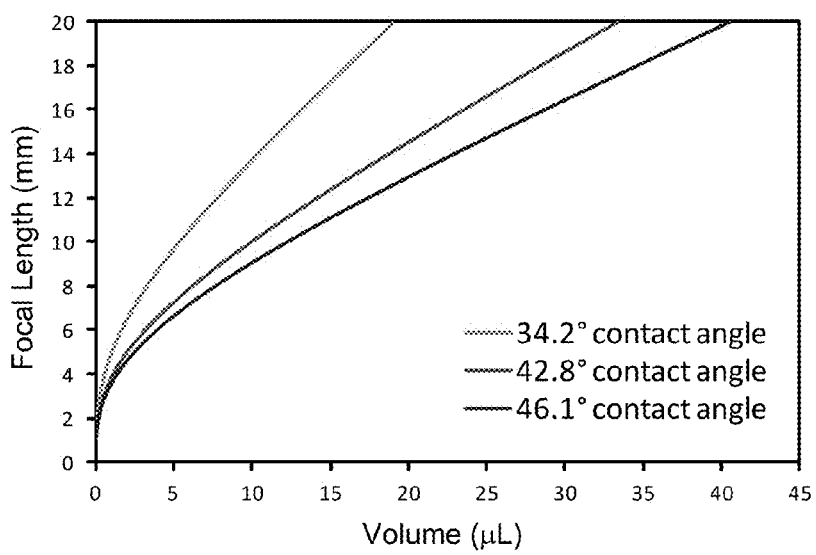
FIG. 4 is a graph of focal length as a function of lens volume and liquid contact angle.

Using this model, FIG. 4 graphs the focal length of a liquid drop lens as a function of lens volume and liquid contact angle. Given a contact angle and a volume, the lens profile can be predicted and so can the lens' focal length. Conversely, if the contact angle and the desired focal length are known, the corresponding volume of liquid can be calculated to produce a lens with the desired characteristics. The diameter and focal length of a lens grows with the volume of liquid dispensed.

Forces due to friction and viscosity, as well as the surface roughness of the substrate, can also be taken into consideration to estimate the contact angle of the liquid. Rough glass has many micro or nanoscale cavities and ridges covering its surface. If the surface is partially wet, the drop 110 does not fully penetrate the depths of these cavities. For rough glass, the contact angle is found by minimizing the total surface energy of the system. Surface energy is equal to the surface tension multiplied by the area of the surface. For drops on partially wet surfaces, there will be a fraction of the area of the drop 110 that touches glass, and a fraction of the drop 110 which is in contact with air trapped beneath the drop in these cavities. If x is the fraction of the liquid surface at the solid-liquid interface that actually touches the glass and (1−x) is the fraction of the liquid that is in contact with air, then the effective surface tension of the rough surface will be the sum of these fractional surface tensions. This effective surface tension is higher than the surface tension of the liquid on a smooth piece of glass.

$$\gamma_{LS,rough} = x\gamma_{LS,smooth} + (1-x)\gamma_{LG} \quad (6)$$

$$\gamma_{LS,smooth} - \gamma_{LS,rough} < \gamma_{LG} \quad (7)$$

where γ are the surface tensions. The subscripts LG denotes the liquid-gas interface, LS,smooth denotes the liquid-solid surface interface for a smooth surface, and LS,rough denotes the liquid-solid surface interface for a rough surface.

Furthermore, physical systems tend to try to minimize their free energy. These systems are considered to be at stable equilibrium. Stable equilibrium occurs in a drop 110 on a rough surface when the surface is fully wet. The reason a drop 110 may not fully wet right away is because local surface tension of the liquid and the air in the cavities prevents the liquid from filling the cavity. There is an energy barrier preventing a partially wet drop from fully wetting the surface of rough glass. It is often the case in thermodynamics that the application of heat can help a system overcome an energy barrier and minimize its free energy.

Liquid Drop Lenses Manufacturing Method

FIG. 5 shows a system for fabricating liquid drop lenses and FIG. 6 shows a system for fabricating several liquid drop lenses in parallel. The system includes a dispenser 610 and a substrate 620. In one embodiment, a pipette that can dispense a precise amount of liquid is used as the dispenser 610. In other embodiments, the dispenser 610 includes multiple tips (610a-610d) that are used to fabricate multiple lenses in parallel. In other embodiments, a pointed tip can be used as the dispenser 610 and the volume being dispensed can be controlled by the amount of time the tip is in contact with the substrate. In one embodiment, the substrate 620 is a planar substrate such as a glass substrate or a semiconductor substrate. In some embodiments, the surface of the substrate 620 can be treated to obtain a desired surface property. For example, the substrate 620 can be exposed to hexamethyldisilazane (HMDS) to increase the hydrophobicity of the substrate's surface.

FIG. 7 shows a flowchart for the fabrication of liquid drop lenses. To fabricate the liquid drop lens, the curable liquid is loaded 710 into the dispenser 610. In one embodiment, the dispenser is dried after loading the curable liquid. For example, if a pipette is used as the dispenser 610, the pipette tip is dried to remove the excess liquid that is present on the tip due to the liquid loading process. A substrate 620 on which the lenses are going to be fabricated is loaded 720 under the dispenser 610 and raised 730 until it touches the dispenser. In one embodiment, a micrometer stage or a micromanipulator can be used to precisely position the substrate underneath the dispenser 610. In one embodiment, instead of raising the substrate 620, the dispenser 610 is lowered until the dispenser 610 is in contact with the substrate 620.

The curable liquid has a high viscosity, for example at least 50 cps, more preferably at least 100 cps, or even 200 cps or higher. The high viscosity is desirable because higher viscosity liquids form taller drops, which results in lenses with more optical power. However, high viscosity liquids are more difficult to dispense, especially in low volumes. Contact between the dispenser 610 and substrate 620 can facilitate the dispensing of high viscosity liquids.

After the substrate 620 is in contact with the dispenser 610, a predetermined amount of liquid is dispensed 740 onto the substrate 620. The substrate 620 is lowered 750 until the liquid drop is no longer in contact with the dispenser 610. In some embodiments, the first drop of liquid dispensed from the dispenser is a sacrificial drop and is discarded. The steps described above are repeated in different locations of the substrate until drops for the desired lenses have been dispensed.

The contact between the substrate 620 and the dispenser 610 may be needed to allow the release of the liquid from the dispenser 610 to the substrate 620. In some embodiments, contact between the substrate 620 and the dispenser 610 is not needed. Instead, the substrate 620 is raised until the drop 110 makes contact with the substrate 620, even though the dispenser 610 itself is not in contact with the substrate 620. In one embodiment, if the liquid does not stick to dispenser 610, the substrate 620 can be raised to a position that allows accurate positioning of the drop 110.

The viscosity of the liquid can be modified by changing its temperature. For non-thermally cured materials, raising the temperature may reduce its viscosity and lowering the temperature may increase its viscosity. In some embodiments, a desired liquid viscosity can be achieved by tuning the temperature of the liquid before being dispensed.

After all the drops have been dispensed, the liquid is cured 760. The curing step may require the exposure of the substrate to UV radiation or to an activation temperature depending on the type of curable liquid or resin used. In one embodiment, the substrate is position upside-down during the curing step to leverage on the gravitational force that the drop experiences to generate a prolate spheroid. In other embodiments the orientation of the substrate can be changed during the curing process to obtain different shapes. For example, the substrate can first be partially cured upside-down for half of the time and then completely cured right side-up for the remaining curing time.

Figure 8:
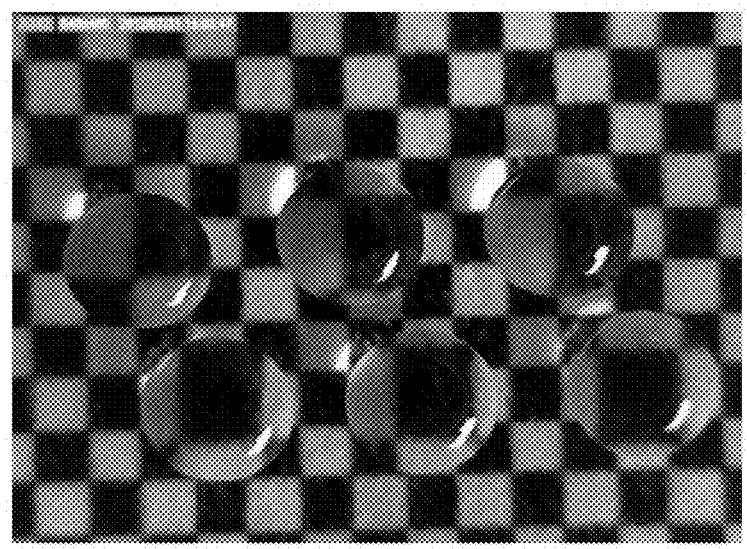
FIG. 8 shows an array of four liquid drop lenses.

Using the above mentioned process, different size lenses can be produced. FIG. 8 shows an array of four lenses with a volume of 2.0 μL and a focal length of 3.6 mm produced using the process of FIG. 7. Using this process, we have manufactured lenses ranging from 0.01 to 2.0 μL in volume, from 0.09 to 3.60 mm in focal length, and from 0.01 to 7 mm in diameter. These processes are especially suitable for the fabrication of miniature lenses, especially circular lenses with a diameter smaller than 10 mm, including those that are less than 1 mm in diameter and less than 2 mm in focal length.

One advantage of liquid drop lenses is the ease of fabrication and the reduction in cost compared to other millimeter or micrometer size lenses. Liquid drop lenses do not require the patterning of special structures on the substrate or the use of expensive equipment. The substrate can be planar and featureless. Liquid drop lenses can be used in applications where the price and reliability of the fabrication process is important.

Figure 9:
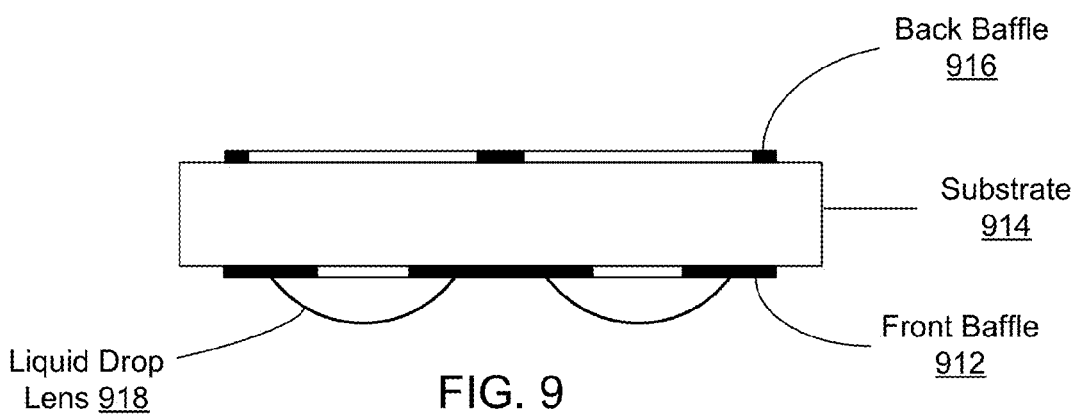
FIG. 9 shows an example of a stereo imager.

Applications of these liquid drop lenses include systems that take multiple images, including stereo imagers and multi-aperture imagers. FIG. 9 shows an example of a stereo imager. In this example, two liquid drop lenses 918 are formed on one side of a substrate 914. A front baffle 912 is also formed on the substrate 914 to reduce unwanted light. The back side of the substrate includes a second baffle 916. A sensor array can be attached to the back side of the substrate 914, either directly or spaced apart from the back surface. This example of two imagers can be extended to more than two imagers.

Although the detailed description contains many specifics, these should not be construed as limiting the scope of the invention but merely as illustrating different examples and aspects of the invention. It should be appreciated that the scope of the invention includes other embodiments not discussed in detail above. For example, automatic high-viscous liquid dispensers may be used instead of pipettes. Further, the liquid drop may be dispensed on a thick planar substrate, which is then placed on a light sensor. The planar substrate could be a homogeneous medium with uniform refractive index or a gradient index medium. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A method for fabricating lenses on a substrate, the method comprising:
    making contact between a dispenser and a surface of a substrate;
    dispensing a predetermined volume of a curable liquid from the dispenser onto the surface of the substrate while the dispenser is in contact with the surface of the substrate and while the curable liquid is in contact with the surface of the substrate, the curable liquid having a viscosity of at least 100 cps; and
    curing the predetermined volume of curable liquid to a solid form, the predetermined volume of curable liquid forming one single lens; and
    repeating the above steps, each dispensed predetermined volume of the curable liquid cured to form one single lens.

2. The method of claim 1, wherein the curable liquid is a liquid epoxy or a liquid polymer.

3. The method of claim 1, wherein the one single lens has a circular aperture with diameter of not more than 1 mm.

4. The method of claim 1, wherein the one single lens has a circular aperture with diameter of not more than 500 μm.

5. The method of claim 1, wherein the curable liquid has a viscosity of at least 200 cps.

6. The method of claim 1, wherein the curable liquid is cured while supported by the surface of the substrate.

7. The method of claim 1, wherein the curable liquid is cured while suspended from the surface of the substrate.

8. The method of claim 1, wherein the substrate is a featureless, planar substrate.

9. The method of claim 1, wherein the substrate is transparent.

10. The method of claim 1, wherein the substrate is homogeneous with a uniform refractive index.

11. The method of claim 1, wherein the substrate is inhomogeneous with a gradient in refractive index.

12. The method of claim 1, wherein curing the predetermined volumes of curable liquid to a solid form forms an array of lenses, each predetermined volume of curable liquid forming one single lens in the array of lenses.

13. The method of claim 1, wherein the predetermined volumes of curable liquid are dispensed simultaneously at multiple locations on the substrate.

14. The method of claim 1, wherein the predetermined volumes of liquid are dispensed sequentially at each of the multiple locations on the substrate.

15. A plurality of lenses manufactured by the process of claim 1.

16. The plurality of lenses of claim 15 wherein a surface of each single lens is characterized by $$z(r) = \frac{r/R^2}{1+\sqrt{1-(r/R)^2}} + \sum_{n=2}^{N} a_n r^{2n}$$

where z(r) is a height of the lens at radius r, R is a radius of curvature at the center of the lens, $$a_2 = -\frac{1}{32R}\left(\frac{1}{R^2} + \frac{1}{L_c^2}\right)$$

$$a_3 = -\frac{1}{576R}\left(\frac{23}{R^4} + \frac{1}{2L_c^4} + \frac{47}{R^2 L_c^2}\right)$$

$$a_4 = -\frac{1}{819R}\left(\frac{375}{R^6} + \frac{1}{9L_c^6} + \frac{3745}{9R^4 L_c^2} + \frac{371}{9R^2 L_c^4}\right)$$

and $L_c$ is a characteristic length of the epoxy or polymer forming the lens.

17. The plurality of lenses of claim 15 wherein a surface of each single lens is characterized by $$z(r) = \frac{r/R^2}{1+\sqrt{1-(r/R)^2}} + \sum_{n=2}^{N} a_n r^{2n}$$

where z(r) is a height of the lens at radius r, R is a radius of curvature at the center of the lens, $$a_2 = -\frac{1}{32R}\left(\frac{1}{R^2} - \frac{1}{L_c^2}\right)$$

$$a_3 = -\frac{1}{576R}\left(\frac{23}{R^4} + \frac{1}{2L_c^4} - \frac{47}{R^2 L_c^2}\right)$$

$$a_4 = -\frac{1}{819R}\left(\frac{375}{R^6} - \frac{1}{9L_c^6} - \frac{3745}{9R^4 L_c^2} + \frac{371}{9R^2 L_c^4}\right)$$

and $L_c$ is a characteristic length of the epoxy or polymer forming the lens.

18. The plurality of lenses of claim 15 wherein the curable liquid is a liquid epoxy or a liquid polymer.

19. The plurality of lenses of claim 15 wherein the one single lens has a circular aperture with diameter of not more than 1 mm.

20. The plurality of lenses of claim 15 wherein the plurality of lenses is an array of lenses.

* * * * *